# United States Patent
Roberts et al.

[11] 3,868,890
[45] Mar. 4, 1975

[54] SEAL FOR HYDRAULIC PRESSURE MODULATOR

[75] Inventors: James K. Roberts; Edward M. Pauwels, both of South Bend, Ind.

[73] Assignee: The Bendix Corporation, South Bend, Ind.

[22] Filed: Oct. 1, 1973

[21] Appl. No.: 402,545

[52] U.S. Cl............................. 92/86, 91/1, 91/401, 92/5 R, 137/312
[51] Int. Cl............................................. F01b 31/00
[58] Field of Search ....... 92/86, 5 R; 137/312; 91/1, 91/400, 401

[56] References Cited
UNITED STATES PATENTS

| | | | |
|---|---|---|---|
| 2,383,278 | 8/1945 | Stevens | 92/5 R X |
| 3,064,429 | 11/1962 | Hager | 92/5 R X |
| 3,131,638 | 5/1964 | Wilson et al. | 92/86 X |
| 3,145,659 | 8/1964 | Svendsen | 92/86 X |
| 3,185,041 | 5/1965 | Stein | 92/5 R X |
| 3,263,618 | 8/1966 | Carpenter | 92/86 X |
| 3,704,652 | 12/1972 | Hoenick | 92/86 X |
| 3,795,423 | 3/1974 | Shields et al. | 303/6 C |

FOREIGN PATENTS OR APPLICATIONS

| | | | |
|---|---|---|---|
| 480,106 | 1/1952 | Canada | 92/86 |

Primary Examiner—Irwin C. Cohen
Assistant Examiner—Abraham Hershkovitz
Attorney, Agent, or Firm—Ken C. Decker; William N. Antonis

[57] ABSTRACT

A hydraulic device is disclosed which includes a diaphragm which assures separation between two incompatible fluids communicated into a housing so that a fluid leaking past its corresponding seal cannot damage the seal which prevents leakage of the other fluid. The hydraulic device includes a piston slidably mounted within a housing, and the aforementioned diaphragm interconnects the piston with the housing wall. The peripheral edge of the diaphragm is received in a passage which communicates the interior of the housing device with the exterior. The diaphragm is provided with a pair of resilient lips which extend into the aforementioned passage and are adapted to control fluid communication therethrough. The lips are responsive to movement of the piston to seal against the passage during stroke of the piston in one direction due to the partial vacuum created within the housing, to thereby prevent entry of exterior contaminants into the housing. Upon stroke of the piston in the opposite direction, the increase of fluid pressure in the housing expels the accumulated fluid seepage within the housing past the lips to the housing exterior.

12 Claims, 3 Drawing Figures

PATENTED MAR 4 1975

3,868,890

SEAL FOR HYDRAULIC PRESSURE MODULATOR

BACKGROUND OF THE INVENTION

This invention relates to a hydraulic device wherein incompatible fluids are communicated into a single housing.

Hydraulic devices used in vehicle braking systems often require that two incompatible fluids be communicated into a single housing. For example, common brake fluid is incompatible with common power steering or automatic transmission fluid, and the seals which prevent leakage of these two fluids must be made of different materials. However, the material which seals against leakage of the brake fluid will be damaged upon contact with the power steering or automatic transmission fluid, and conversely. Therefore, it is absolutely necessary in hydraulic devices in which incompatible fluids are communicated into a common housing that leakage of one of the fluids past its corresponding seal is not able to contact the other seal. Although our device is described herein in connection with an adaptive braking modulator, it should be clearly understood that the teachings of our invention are equally applicable to any hydraulic device wherein incompatible fluids are communicated into a common housing.

SUMMARY OF THE INVENTION

Therefore, an important object of our invention is to insure separation between incompatible fluids communicated into a common housing.

Another important object of our invention is to insure that, in a hydraulic device wherein incompatible fluids are communicated to a common housing, that leakage of one of the fluids past its corresponding seal will not come into contact with the seal preventing leakage of the other fluid.

Still another important object of our invention is to provide a hydraulic device which receives incompatible fluids with structure which insures separation of the fluids even though they leak past their corresponding seal, and which expels this leakage from the housing during normal operation of the device.

A still further object of our invention is to prevent the partial vacuum created within the housing during operation of the device from forcing exterior contaminants into the housing.

DETAILED DESCRIPTION

Figure 1:
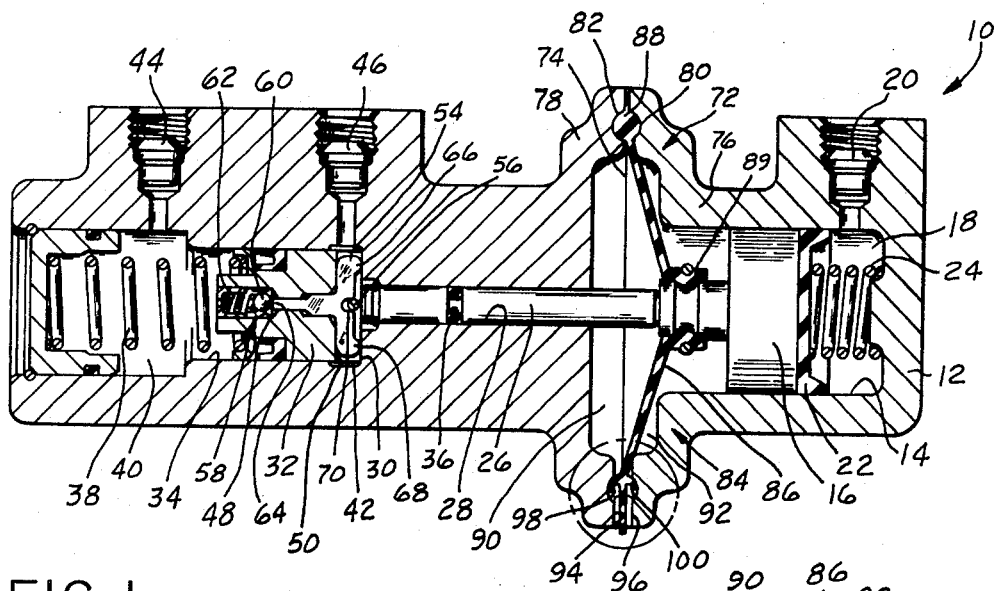
FIG. 1 is a longitudinal cross sectional view of an adaptive braking modulator including a device for insuring separation of incompatible fluids made pursuant to the teachings of our present invention.
Figure 3:
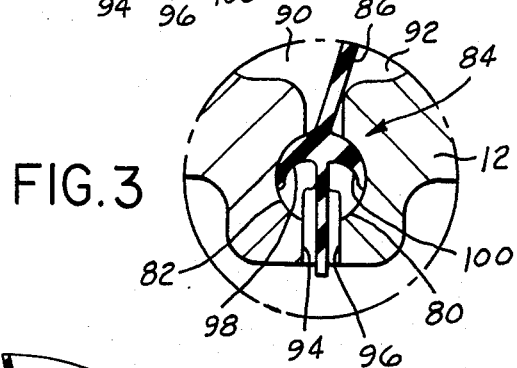
FIG. 3 is an enlarged view of the circumscribed portion of FIG. 1.
Figure 2:
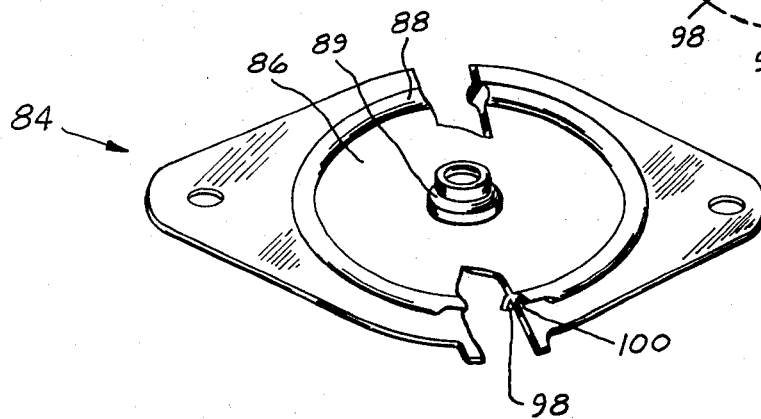
FIG. 2 is a perspective view of the diaphragm used in the device illustrated in FIG. 1.

Referring now to the drawings, an adaptive braking modulator generally indicated by the numeral 10 includes a housing 12 defining a bore 14 therewithin. A piston 16 slidably mounted in the bore 14 and defines a fluid chamber 18 between one end of the piston and a corresponding end of the bore. The chamber 18 is provided with a port 20 which communicates the chamber 18 with a fluid pressure source and with a fluid reservoir. Communication between the chamber 18 and the fluid pressure source and fluid reservoir is controlled by a three-way solenoid actuated valve (not shown) which is actuated by electrical signals from an electronic control unit. Details of the construction and operation of the aforementioned three-way solenoid valve, and the manner in which it is connected to the vehicle's hydraulic system, are more completely disclosed in U.S. Patent Application Ser. No. 289,930, filed Sept. 18, 1972, now U.S. Pat. No. 3,795,423, owned by the assignee in the present invention and incorporated herein by reference. A cup seal 22 is provided which prevents leakage from the chamber 18 through the interface between the piston 16 and the housing 12. A very light spring 24 is provided to insure contact between the seal 22 and the face of the piston 16.

A plunger 26 is slidably mounted in another bore 28 defined within housing 12 and the right hand end (viewing FIG. 1) of the plunger 26 is adapted to be engaged by the end of the piston 16. The opposite end of the plunger 26 is adapted to engage the end 30 of another piston 32 which is slidably mounted in yet another bore 34 defined within the housing 12. A seal 36 is provided on the plunger 26 to prevent leakage from the bore 34 through the interface between the plunger 26 and the bore 28. A spring 38 yieldably urges the piston 32 to the right viewing FIG. 1. Since opposite ends of the plunger 26 are engaged with the pistons 32 and 16, respectively, and since the spring 38 is much stronger than the spring 24, the spring 38 will normally urge the pistons 32 and 16 and the plunger 26 toward the position illustrated in FIG. 1 when the chamber 18 is communicated to reservoir pressure.

The piston 32 divides the bore 34 into an inlet chamber 40 and an outlet chamber 42. A port 44 communicates the inlet chamber 40 with the vehicle's master cylinder, and an outlet port 46 communicates the outlet chamber 42 with the brakes of the vehicle. A passage 48 extends through the piston 32 to communicate the chambers 40 and 42. The end 30 of the piston 32 is provided with a narrow slot 50 which receives the elongated end of a substantially flat, T-shaped key 54, the opposite end of which projects into the passage 48. The width of the slot 50 is substantially less than the diameter of the plunger 26, so that the plunger 26 may engage the end 30 of the piston 32 to move the latter upon actuation of the piston 16. A pin 56 retains the key 54 to the piston. A valve generally indicated by the numeral 58 is also located within the passage 48, and includes a sphere 60 which is yieldably urged by a spring 62 toward a valve seat 64, so that when the sphere 60 engages the valve seat 64, fluid communication through the passage 48 from the chamber 40 into chamber 42 is prevented. However, the T-shaped key 54 is provided with detents 66, 68 which are adapted to engage the end of the bore 34 so that when the end 30 of the piston 32 is urged to engagement with the end of the bore 34, the detents 66 and 68 are of sufficient width to insure that the opposite end of the key 54 will maintain the sphere 60 off the valve seat 64. The distance between the detents 66 and 68 is much greater than the diameter of the plunger 26. Therefore, when the piston 32 is urged away from the end of the bore 34 by the plunger 26 and the piston 16, the force of the spring 62 urges the sphere 60 and the key 54 to the right viewing the figure, until the pin 56 engages the end of the slot 70 provided in the key 54. This movement of the key 54 is sufficiently great to allow the sphere 60 to sealingly engage the valve seat 64.

To accommodate leakage around the seals 22 and 36, a sump chamber generally indicated by the numeral 72 has been provided. Housing 12 is split transversely along the line 74 to divide the housing 12 into a pair of sections 76 and 78. Each of the sections 76 and 78 is provided with registering semi-toroidal grooves 80, 82 which circumscribe the housing 12 in a plane transverse to that of the bore 14. The diaphragm generally indicated by the numeral 84 includes a web 86 which is provided with a perimetrical bead 88 which is received within the grooves 80 and 82 when the sections 76 and 78 are clamped together so that the diaphragm 84 is sealingly engaged with the housing 12. The central portion 89 of the diaphragm 84 is clamped to the piston 16 and is movable therewith. Therefore, the web 86 divides the sump chamber 72 into a first compartment 90 and a second compartment 92. Slots 94, 96 are formed on the face of each of the sections 76, 78 where the sections are joined together. Each of the slots 94, 96 intersect a corresponding groove 80 or 82, and consequently, when the sections are joined together, the slots 94 and 96 cooperate with the web 86 of the diaphragm 84 to define a first passage communicating the chamber 90 with the exterior of the housing 12 and a second passage communicating the other chamber 92 with the exterior of the housing 12. A corresponding segment of the bead 88 is cut away to define a pair of arcuately extending, resilient lips 98, 100 carried on opposite sides of the web 86 of the diaphragm 84. As can be seen from viewing FIG. 1, the lips 98, 100 cooperate with the corresponding grooves 80 and 82 to control communication from the compartments 90 and 92 to the exterior of the housing 12.

MODE OF OPERATION

The various components of the modulator 10 are illustrated in FIG. 1 in the positions which they assume when the brakes of the vehicle are actuated normally without requiring intervention of the adaptive braking system. In this condition, fluid pressue is communicated directly from the inlet port 44 to the outlet port 46 through the passage 48, since the key 54 maintains the valve 58 open. The chamber 18 is vented to reservoir pressure. When the aforementioned logic controller senses an incipient skidding condition, the aforementioned three-way solenoid valve is actuated to terminate fluid communication between the chamber 18 and the reservoir and to initiate fluid communication between the chamber 18 and the aforementioned pressure source. When this occurs, the high fluid pressure level communicated into the chamber 18 acts on the piston 16 to urge the latter to the left viewing FIG. 1. Therefore, since the pistons 16 and 32 engage opposite ends of the plunger 26, movement of the piston 16 will be transmitted to move piston 32 to the left viewing FIG. 1. As the piston 32 moves away from the end of the bore 34, spring 62 closes the valve 58 thereby terminating fluid communication through the passage 48 and thereby also terminating the increase in braking pressure communicated to the brakes of the vehicle. As the piston 16 moves further to the left, so that the piston 32 also moves further to the left, the volume of the outlet chamber 42 is increased, thereby reducing the fluid pressure level therein and therefore also decreasing the braking pressure communicated to the brakes of the vehicle. When the aforementioned electronic control unit senses that an incipient skidding condition no longer exists, the chamber 18 is again vented to reservoir pressure to permit the spring 38 and the fluid pressure force generated by the pressure level in chamber 40 acting against the left face of piston 32 to urge the latter, the plunger 26, and the piston 16 to the right viewing FIG. 1, toward the position illustrated in the drawing.

As is well known to those skilled in the art, brake fluid, such as that communicated into the chambers 40 and 42, is highly incompatible with the power steering or automatic transmission fluids used in the vehicle's hydraulic system which is communicated into the pressure chamber 18. Therefore, seals 22 and 36 must be made of different materials which are compatible with the fluids that they are designed to seal against. However, if the opposite fluid would come into contact with the seals 22 or 36 (for example, if the brake fluid leaking past the seal 36 should come into contact with the seal 22, and conversely), the respective seals would be destroyed, thereby damaging the modulator. Therefore, it is particularly important that the different types of fluid never be allowed to contact one another or to contact seals which are designed for use with the opposite type of fluid. However, during normal operation of the booster, brake fluid will inevitably leak past the seal 36 and power steering fluid will inevitably leak past the seal 22. The brake fluid leaking past the seal 36 is communicated into compartment 90 of the sump chamber 72, and similarly, hydraulic fluid leaking past the seal 22 will be communicated into compartment 92 of the sump chamber 72. However, web 86 of the diaphragm 84 will maintain separation between the hydraulic fluid and the brake fluid and thereby it is impossible for hydraulic fluid to come into contact with the seal 36 and brake fluid to come into contact with the seal 22. Furthermore, when one of the compartments 90 or 92 fills with fluid, the corresponding lips 98 or 100 will deflect to permit the fluid to drain from the housing. Also, during normal operation of the modulator 10, the piston 16 is driven to the left by fluid pressure in chamber 18. As the piston moves to the left, the volume of compartments 90 and 92 are reduced, thereby increasing the pressure level in the latter. This increased pressure level deflects the lips 98 and 100 to permit the fluid which has seeped past seals 22 and 36 into the corresponding chamber compartments 92 and 90 to drain through the slots 94 and 96 to the exterior of the housing. Similarly, when the chamber 18 is again vented to the reservoir, the piston 16 moves to the right viewing the figure, thereby increasing the fluid pressure level of the compartments 90 and 92 and creating a partial vacuum for a brief time in these compartments. The partial vacuum sucks the lips 98 and 100 into engagement with the grooves 80 and 82 to thereby prevent contaminants from being sucked into the compartments 90 and 92 from the exterior of the housing 12.

We claim:

1. In a hydraulic device:
   a housing defining a bore therewithin,
   a diaphragm secured to said housing and including a web extending transversely across said bore to divide the latter into a pair of compartments;
   said housing defining a passage communicating said bore with the exterior of said housing, said diaphragm extending into said passage, said web dividing said passage into a first section for communicating one of said compartments with the exterior of the housing and a second section for communicating the other compartment with the exterior of the housing, and a pair of movable lips extending from opposite sides of said diaphragm for engagement with opposite walls of said passage and when in disengagement with said passage, permitting said communication between the respective compartments and the exterior of the housing.

2. The invention of claim 1:
said housing being split transversely of said bore into first and second portions, said diaphragm including a perimetrical bead clamped between said portions, a section of said perimetrical bead being cut away to define said lips.

3. The invention of claim 2:
a circumferential groove formed in the interface between said first and second portions, said bead being received in said groove, said passage intersecting said groove.

4. The invention of claim 3:
said lips being disposed within the portion of the groove at the intersection of the passage and said groove, said lips normally engaging the walls of the groove.

5. The invention of claim 4:
means moving said web relative to said bead to increase the fluid pressure level in at least one of said compartments during movement of the web in one direction to thereby expel fluid in at least said one compartment to the exterior of said housing around the corresponding lip.

6. The invention of claim 5:
means in said housing whereby upon movement of said web in a direction opposite to said one direction a partial vacuum is created in at least said one compartment to urge said corresponding lip into sealing engagement with said housing to prevent entry of contaminants into said housing.

7. The invention of claim 6:
said means moving said web including a piston slidably mounted in said bore, one end of said piston being operably connected to said web, the other end of said piston cooperating with the corresponding end of said bore to define a fluid receiving volume therebetween.

8. The invention of claim 1,
said web extending through said passage in a substantially axial plane with respect to the passage.

9. In a hydraulic device:
a housing defining a bore therewithin;
a diaphragm secured to said housing and including a web extending transversely across said bore to divide the latter into a pair of compartments,
passage means extending through the wall of said housing to communicate one of said compartments with the exterior of said housing, said diaphragm extending into said passage means, said web dividing said passage into a first section for communicating one of said compartments with the exterior of the housing and a second section for communicating the other compartment with the exterior of the housing;
means slidably mounted within said housing for moving said web, so that the volume of said one chamber is decreased to thereby raise the pressure level therein when the web is moved in one direction and the pressure level in said one chamber is decreased during movement of the web in the opposite direction; and
valve means carried by said diaphragm and cooperating with said passage means, said valve means being responsive to the fluid pressure level in said one chamber to open said passage means upon increase of fluid pressure in said one chamber due to movement of said diaphragm in said one direction to permit liquid content of said one chamber to drain through said passage means and to seal said passage means to prevent entry of contaminants into said one chamber from the exterior of said housing upon decrease of the fluid pressure level in said one chamber upon movement of said diaphragm in said opposite direction.

10. The invention of claim 9:
said valve means being a resilient lip carried by said diaphragm.

11. The invention of claim 9,
said web extending through said passage in a substantially axial plane with respect to the passage.

12. In a hydraulic device:
a housing defining a bore therewithin;
a diaphragm secured to said housing and including a web extending transversely across said bore to divide the latter into a pair of compartments,
passage means extending through the wall of said housing to communicate one of said compartments with the exterior of said housing, said diaphragm extending into said passage means;
means slidably mounted within said housing for moving said web, so that the volume of said one chamber is decreased to thereby raise the pressure level therein when the web is moved in one direction and the pressure level in said one chamber is decreased during movement of the web in the opposite direction; and
valve means carried by said diaphragm and cooperating with said passage means, said valve means being responsive to the fluid pressure level in said one chamber to open said passage means upon increase of fluid pressure in said one chamber due to movement of said diaphragm in said one direction to permit liquid content of said one chamber to drain through said passage means and to seal said passage means to prevent entry of contaminants into said one chamber from the exterior of said housing upon decrease of the fluid pressure level in said one chamber upon movement of said diaphragm in said opposite direction;
said valve means being a resilient lip carried by said diaphragm;
said passage means being an opening in said housing, said diaphragm bisecting said opening to form a first passage defined in one side of said diaphragm communicating with said one chamber and another passage defined on the opposite side of said diaphragm communicating with the other chamber;
there being two of said lips, one on each side of said diaphragm, each of said lips cooperating with their corresponding passages to control communication therethrough.

* * * * *